(12) United States Patent
Dawson

(10) Patent No.: US 9,223,481 B2
(45) Date of Patent: *Dec. 29, 2015

(54) METHOD AND APPARATUS FOR CUSTOMIZING MAP PRESENTATIONS BASED ON MODE OF TRANSPORT

(71) Applicant: HERE GLOBAL B.V., Veldhoven (NL)

(72) Inventor: Astrid Dawson, Berlin (DE)

(73) Assignee: HERE GLOBAL B.V., Veldhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/216,415

(22) Filed: Mar. 17, 2014

(65) Prior Publication Data

US 2014/0201668 A1   Jul. 17, 2014

Related U.S. Application Data

(63) Continuation of application No. 12/690,442, filed on Jan. 20, 2010, now Pat. No. 8,699,991.

(51) Int. Cl.
*H04W 64/00* (2009.01)
*G06F 3/0484* (2013.01)
*G09B 29/00* (2006.01)

(52) U.S. Cl.
CPC ............ *G06F 3/0484* (2013.01); *G09B 29/007* (2013.01); *G09B 29/008* (2013.01)

(58) Field of Classification Search
CPC . H04M 1/6505; H04M 1/72572; H04M 1/56; H04M 1/575; H04W 64/00
USPC ......... 455/404.2, 457, 414.2, 456.1; 701/714, 701/716, 533; 340/870.02
See application file for complete search history.

(56) References Cited

U.S. PATENT DOCUMENTS

| | | | |
|---|---|---|---|
| 5,944,768 A * | 8/1999 | Ito et al. | 701/418 |
| 6,810,328 B2 * | 10/2004 | Yokota et al. | 701/414 |
| 7,668,646 B2 * | 2/2010 | Sasano | 701/416 |
| 7,693,652 B2 | 4/2010 | Cheung | |
| 7,987,046 B1 * | 7/2011 | Peterman et al. | 701/454 |
| 8,024,115 B2 * | 9/2011 | Hayashida et al. | 701/414 |
| 8,050,862 B2 * | 11/2011 | Weiss et al. | 701/423 |
| 8,063,792 B2 * | 11/2011 | Sala et al. | 340/870.02 |
| 8,699,991 B2 * | 4/2014 | Fasold | 455/404.2 |
| 2003/0172368 A1 * | 9/2003 | Alumbaugh et al. | 717/106 |
| 2005/0033511 A1 * | 2/2005 | Pechatnikov et al. | 701/210 |
| 2006/0184314 A1 | 8/2006 | Couckuyt et al. | |
| 2007/0093955 A1 | 4/2007 | Hughes | |
| 2008/0208443 A1 | 8/2008 | Massie et al. | |
| 2009/0119001 A1 | 5/2009 | Moussaeiff et al. | |
| 2009/0192851 A1 * | 7/2009 | Bishop | 705/7 |
| 2009/0299620 A1 | 12/2009 | Shin et al. | |
| 2010/0114469 A1 * | 5/2010 | Chao et al. | 701/200 |

(Continued)

FOREIGN PATENT DOCUMENTS

| WO | 2005098362 A1 | 10/2005 |
|---|---|---|
| WO | 2006085740 A1 | 8/2006 |

*Primary Examiner* — Minh D Dao
(74) *Attorney, Agent, or Firm* — Ditthavong & Steiner, P.C.

(57) ABSTRACT

An approach is provided for customizing map presentations based on mode of transport. A map customizing platform determines a mode of transport with respect to a mapping service. The map customizing platform then selects one or more characteristics for rendering a map display of the mapping service based, at least in part, on the mode of transport and causes, at least in part, rendering of the map display based, at least in part, on the characteristics.

20 Claims, 9 Drawing Sheets

(56) References Cited

U.S. PATENT DOCUMENTS

2010/0268450 A1* 10/2010 Evanitsky .................... 701/201
2011/0205697 A1* 8/2011 Callicoat et al. ......... 361/679.01
2012/0123639 A1* 5/2012 Ochiai et al. .................... 701/36

* cited by examiner

METHOD AND APPARATUS FOR CUSTOMIZING MAP PRESENTATIONS BASED ON MODE OF TRANSPORT

RELATED APPLICATIONS

This application is a continuation of U.S. patent application Ser. No. 12/690,442, filed Jan. 20, 2010, the contents of which are incorporated herein by reference in their entirety.

BACKGROUND

Service providers (e.g., wireless and cellular services) and device manufacturers are continually challenged to deliver value and convenience to consumers by, for example, providing compelling network services and advancing the underlying technologies. One area of interest has been the development of services and technologies for customizing data that is presented to users by mapping services and other services that depend on maps (e.g., navigation services). More specifically, electronic mapping services have access to vast stores of detailed information related a variety of map elements (e.g., roads, points of interest, buildings, parks, tourist attractions, etc.) that can be rendered in a map display. In fact, the number of map elements and related information available for display often greatly exceeds (1) the display area of the device presenting the map-related service, and/or (2) the ability of a user to easily use or comprehend the information rendered in the map display. Accordingly, service providers and device manufacturers are challenged to develop new mechanisms for customizing map presentations to display, highlight, or otherwise indicate those map elements and related information that are most relevant to a particular user.

SOME EXAMPLE EMBODIMENTS

Therefore, there is a need for an approach for automatically and efficiently customizing map presentations.

According to one embodiment, a method comprises determining a mode of transport with respect to a mapping service. The method also comprises selecting one or more characteristics of a map display of the mapping service based, at least in part, on the mode of transport. The method further comprises causing, at least in part, rendering of the map display based, at least in part, on the characteristics.

According to another embodiment, an apparatus comprising at least one processor, and at least one memory including computer program code, the at least one memory and the computer program code configured to, with the at least one processor, cause the apparatus to determine a mode of transport with respect to a mapping service. The apparatus is also caused to select one or more characteristics of a map display of the mapping service based, at least in part, on the mode of transport. The apparatus is further caused to render the map display based, at least in part, on the characteristics.

According to another embodiment, a computer-readable storage medium carrying one or more sequences of one or more instructions which, when executed by one or more processors, cause an apparatus to determine a mode of transport with respect to a mapping service. The apparatus is also caused to select one or more characteristics of a map display of the mapping service based, at least in part, on the mode of transport. The apparatus is further caused to render the map display based, at least in part, on the characteristics.

According to another embodiment, an apparatus comprises means for determining a mode of transport with respect to a mapping service. The apparatus also comprises means for selecting one or more characteristics of a map display of the mapping service based, at least in part, on the mode of transport. The apparatus further comprises means for causing, at least in part, rendering of the map display based, at least in part, on the characteristics.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

A method and apparatus for customizing map presentations based on user interests are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "mode of transport" refers generally to the means by which a user intends to travel when using a mapping service. By way of example, these means may include driving, walking (e.g., pedestrian), bicycling, using public transportation, and the like. It is contemplated that these means may include any form of mechanical or human-powered transport. It is also contemplated that the user may select more than one mode of transport for use in a single session or planned trip. In this case, the session or trip can be described as multi-modal with respect to the mode of transport. Moreover, although various embodiments are primarily described with respect to driving and/or walking as the modes of transport, it is contemplated that the approach described herein may be used with any other modes of transport.

Figure 1:
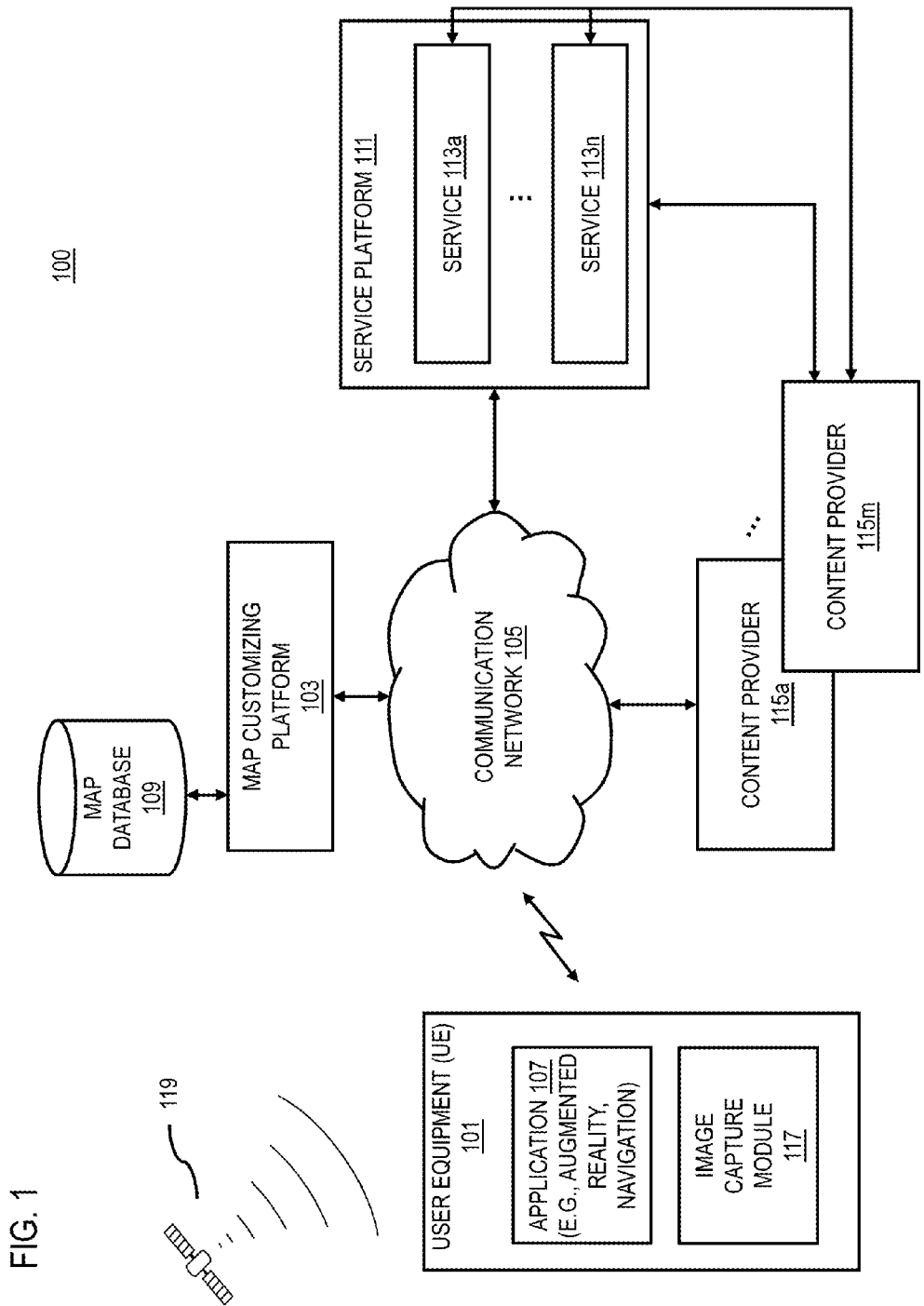
FIG. 1 is a diagram of a system capable of customizing map presentations based on mode of transport, according to one embodiment.

FIG. 1 is a diagram of a system capable of customizing map presentations based on mode of transport, according to one embodiment. Since users use maps for different purposes, there are some parts or elements of a map display (e.g., locations, paths, routes, points of interest, metadata, media files, etc.) that may be of interest to the user when using one mode of transport (e.g., driving) versus another mode (e.g., walking). To filter out unwanted information on these maps or otherwise customize the map display or presentation, the user traditionally would have to manually specify search criteria and/or preferences. The list of preferences and options (e.g., categories of points of interests to display, level of map detail, map style, etc.) can be quite long and require significant user input to specify. As a result, a user may be discouraged from or may find it overly difficult to specify the preferences for customizing the map presentation to display or emphasize information (e.g., points of interest, locations, etc.) of importance to the user when using a particular mode of transport.

To address this problem, a system 100 of FIG. 1 introduces to the capability to automatically select characteristics or themes (e.g., line widths, line styles, fonts, font sizes, icons, models, color schemes, audio alerts, media files, or a combination thereof) for rendering a map display based on a determined mode of transport. More specifically, the system 100 renders various map elements (e.g., a path, road, route, point of interest, terrain feature, bridge, elevator, escalator, stairway, and the like) to make them, for instance, more or less prominent depending on the mode of transport. For example, when operating with driving (e.g., a car) as the mode of transport, the system 100 may reduce visual clutter in the map display by rendering pedestrian walkways or other car-restricted paths using thin lines or subdued colors. Conversely, when operating in a pedestrian mode of transport, the system 100 can render the same pedestrian walkways or other car-restricted paths using thicker lines or more vibrant colors. In this way, the system 100 can advantageously and selectively highlight or render various map elements in the map display to provide better visibility of valuable information to the user depending on the user's mode of transport. Moreover, because the system 100 can manipulate the rendering characteristics of a map independently from the underlying mapping data, the system 100 can store and process one set of mapping data and then manipulate the rendering of the one set to provide maps that are customized according to the various modes of transport, thereby advantageously reducing the computational and storage resources for providing such customized maps.

In certain embodiments, the system 100 analyzes or determines the compatibility and/or relevance of each map element in the map display with respect to the determined mode of transport. The system 100 can use the compatibility and/or relevance information to determine whether or how to render each respective map element. For example, in the example of the car-restricted pathway discussed above, the system 100 first determines that the car-restricted pathway is not compatible with a driving mode of transport (i.e., the user cannot drive on such a pathway). Then, the system 100 may render the pathway to indicate its lack of accessibility by a car (e.g., using dotted lines, a do-not-enter icon, etc.). In this way, the system 100 advantageously provides for dynamic rendering of map elements.

In another embodiment, the system 100 may remove the map element from the map display altogether (e.g., by not rendering the map element). In other words, the system 100 can remove unnecessary information (e.g., map elements) from the map display to further reduce clutter and/or to increase the visibility of valuable information (e.g., compatible or relevant map elements). For example, when operation in a pedestrian mode of transport, the system 100 may determine that highway exit information may not be relevant to pedestrians (e.g., because pedestrians do not generally walk on highways). Accordingly, the exit information that is normally displayed when operating in a driving mode is not rendered in then map display when operating in a pedestrian mode.

It is also contemplated that in certain embodiments, the system 100 may add map elements to the map display depending on the mode of transport. For example, when operating in a pedestrian mode of transport, the system 100 may render icons representing escalators, stairways, elevators, and the like. In another example, when operating in a public transportation mode, the system 100 may render icons representing bus or subway stops.

In yet another embodiment, the system 100 can determine context information (e.g., time, date, weather, activity, or a combination thereof) associated with the mode of transport to further assist in selecting characteristics for rendering map elements in the map display. For example, when operating in a pedestrian mode and the system 100 determines that the context information indicates that it is night time, the system 100 may select rendering characteristics that more prominently display pedestrian pathways that have path lighting. Additionally, during a snow storm, the system 100 can select characteristics or themes that render level paths or routes more prominently than hilly paths to highlight potentially safer routes.

By way of example, it is contemplated that the system 100 can use any mechanism to collect context information including sensors on the user's device, sensors shared by other devices, network services, and the like. For example, the system 100 can automatically obtain location information based services (e.g., GPS navigation and/or tracking, cellular triangulation), location markers or beacons at specific locations (e.g., radio frequency identification (RFID) tags, Bluetooth communication, WLAN communication), biometric reading (e.g., facial recognition via security cameras). In another embodiment, the system 100 can process the media present on a user's device to determine context information (e.g., a current activity). For example, the system 100 can analyze the photos or videos taken using the device to determine context information. The system 100 can also evaluate the messages (e.g., text message, e-mails, audio messages) on the user's device to determine whether there are specific phrases tied to specific contexts. For example, the user may have a text message stating "I am touring Paris"; in one embodiment, the system 100 can correlate the parsed text message with, for instance, accelerometer or GPS sensor data to determine whether the user is walking or driving (i.e., the mode of transport. The system 100 can then interpret the information in the text message as context information that can be used in combination with the determined mode of transport to select map rendering characteristics. In this example, the system 100 may interpret the context information to indicate that the user is a tourist in Paris if, for instance, the user's home network is another location or if location information indicates that the user has not visited Paris in some amount of time (e.g., a year). Accordingly, the system 100 can, for instance, highlight or display points of interests and paths related to tourist activities and attractions. In one embodiment, the context information is linked to one or more map elements and can influence whether one or more of the elements are included in the map display and how the included elements are to be displayed or rendered. In some embodiments, the context information is applied on a set of predefined or preselected map elements.

As shown in FIG. 1, a user equipment (UE) 101 may retrieve mapping information (e.g., two-dimensional (2D) maps, three-dimensional (3D) maps, navigation maps, first person augmented reality views, etc.) from a map customizing platform 103 via a communication network 105. In the example of FIG. 1, the map customizing platform 103 selects characteristics or themes based on a determined mode of transport for rendering a map display as described above. In one embodiment, the rendering characteristics are stored in configuration files (e.g., extensible markup language (XML) files) in the database 109.

By way of example, each configuration file corresponds to a set of display characteristics for a particular mode of transport. In certain embodiments, a separate configuration file may be created for each mode of transport and, in some embodiments, also for context information (e.g., pedestrian day mode, pedestrian night mode, pedestrian navigation day mode, pedestrian navigation night mode, etc.).

In addition or alternatively, the system 100 may employ one baseline configuration file that specifies rendering characteristics or other information regarding the appearance or presentation of each category of map elements in the map display. For example, one category may be created for secondary roads (e.g., neighborhood roads) and another for major roads (e.g., interstate highways). Other categories may include points of interest, terrain features, etc. Then, additional configuration files corresponding to each mode of transport and/or associated context information can be specified to modify the appearance of the affected categories from the baseline or predefined configuration file. More specifically, only differences between the baseline rendering characteristics and the characteristics for a particular mode of transport are specified in the additional configuration files.

In other words, the system 100 defines or provides categories of one or more map elements to reflect at least partly an appearance or rendering characteristic of the map element or item. Then, the system 100 converts at least partly the predefined appearance of the map elements in the affected categories to an appearance corresponding to a selected a map display (e.g., a map display corresponding to a mode of transport and/or associated context information).

In one embodiment, the map customizing platform 103 can obtain content information (e.g., media files) and/or context information for rendering the map display. By way of example, the content and/or context information include one or more identifiers, data, metadata, access addresses (e.g., network address such as a Uniform Resource Locator (URL) or an Internet Protocol (IP) address; or a local address such as a file or storage location in a memory of the UE 101), description, or the like associated with the content and/or context. The content, for instance, includes live media (e.g., streaming broadcasts), stored media (e.g., stored on a network or locally), metadata associated with media, text information, location information of other user devices, mapping data, geo-tagged data (e.g., indicating locations of people, objects, images, etc.), or a combination thereof. The content may be provided by the service platform 111 which includes one or more services 113a-113n (e.g., music service, mapping service, video service, social networking service, content broadcasting service, etc.), the one or more content providers 115a-115m (e.g., online content retailers, public databases, etc.), other content source available or accessible over the communication network 105. In one embodiment, content is delivered from the content providers 115a-115m to the UE 101 through the service platform 111 and/or the services 113a-113n. For example, a service 113a (e.g., a mapping service) may obtain content (e.g., map content) from a content provider 115a to deliver mapping services to the UE 101. As described previously, the context information may include a date, time, weather, activity, or combination thereof. The context information may also be provided by the service platform 111 (e.g., a calendar service, weather service, etc.) and/or the content providers 115a-115m.

In certain embodiments, the mapping information and the maps presented to the user may be an augmented reality view, a simulated 3D environment, a 2D map, or the like. In certain, embodiments, the map display is rendered using a vector-based rendering engine to facilitate dynamic manipulation of the rendering characteristics of the vector-based mapping models. It is also contemplated that the map customizing platform 103 may pre-render the vector-based maps as tiles (e.g., bitmapped sections of the map display) to maintain compatibility with tile-based rendering applications (e.g., a tile-based application 107) and/or reduce the processing burden on the application 107 for rendering vector-based maps. In other embodiments, the simulated 3D environment is a 3D model created to approximate the locations of streets, buildings, features, etc. of an area. This model can then be used to render the location from virtually any angle or perspective for display on the UE 101. In some programs (e.g., navigation application 107), the 3D model or environment enables, for instance, the navigation application 107 to animate movement through the 3D environment to provide a more dynamic and potentially more useful or interesting mapping display to the user. In one embodiment, structures are stored using simple objects (e.g., three dimensional models describing the dimensions of the structures). Further, more complex objects may be utilized to represent structures and other objects within the 3D representation. Complex objects may include multiple smaller or simple objects dividing the complex objects into portions or elements. To create the 3D model, object information can be collected from various databases as well as data entry methods such as processing images associated with location stamps to determine structures and other objects in the 3D model.

In addition or alternatively, the mapping information may be displayed using other user interfaces such as audio interfaces, haptic feedback, and other sensory interfaces. For example, in an audio presentation of the mapping information, the approximate locations of streets, buildings, features, points of interest, content, etc. can be read aloud by a voice synthesizer (not shown) executing on the UE 101.

Additionally or alternatively, in certain embodiments, an image capture module 117 of the UE 101 may be utilized in conjunction with the application 107 to present content information, location information (e.g., mapping and navigation information), availability information, etc. to the user. The user may be presented with an augmented reality interface associated with the application 107 and/or the map customizing platform 103 allowing 3D objects or other representations of content and related information to be superimposed onto an image of a physical environment on the UE 101. In certain embodiments, the user interface may display a hybrid physical and virtual environment where 3D objects from the map database 109 are placed superimposed on top of a physical image.

By way of example, the UE 101 may execute the application 107 to receive content and/or mapping information from the map customizing platform 103 or other component of the network 105. As mentioned above, the application 107 and map customizing platform 103 determines a mode of transport associated with the UE 101 and renders a map display based on a set of rendering characteristics selected based at least in part on the determined mode of transport. In one embodiment, this rendering can selectively highlight or obscure map elements within the map display.

In some embodiments, the map information stored in the map database 109 may be created from 3D models of real-world buildings and other sites. As such, objects can be associated with real world locations (e.g., based on location coordinates such as global positioning system (GPS) coordinates). In certain embodiments, the UE 101 may utilize GPS satellites 119 to determine the location of the UE 101 to utilize the content mapping functions of the map customizing platform 103 and/or the application 107. The map information may include a 3D model (e.g., a complex 3D model) of objects and structures in a physical environment (e.g., buildings) made up of a number of separate but adjoined simple 3D shapes such as polygons. Conventional approaches of 3D modeling include the ability to access and transform each polygon in size and shape separately from the other polygons that form the complete 3D model of the object. Although the database 109 is depicted with connectivity to the map customizing platform 103, it is contemplated that the database 109 or the mapping information contained therein may, in addition or alternatively, be a component of the service platform 111, the services 113a-113n, and/or the content provider 115a-115m.

The map customizing platform 103, the service platform 111, and/or the content provider 115 can be implemented, for instance, via shared or partially shared hardware equipment or different hardware equipments By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, the map customizing platform 103, and the service platform 111, and the content providers 115a-115m communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
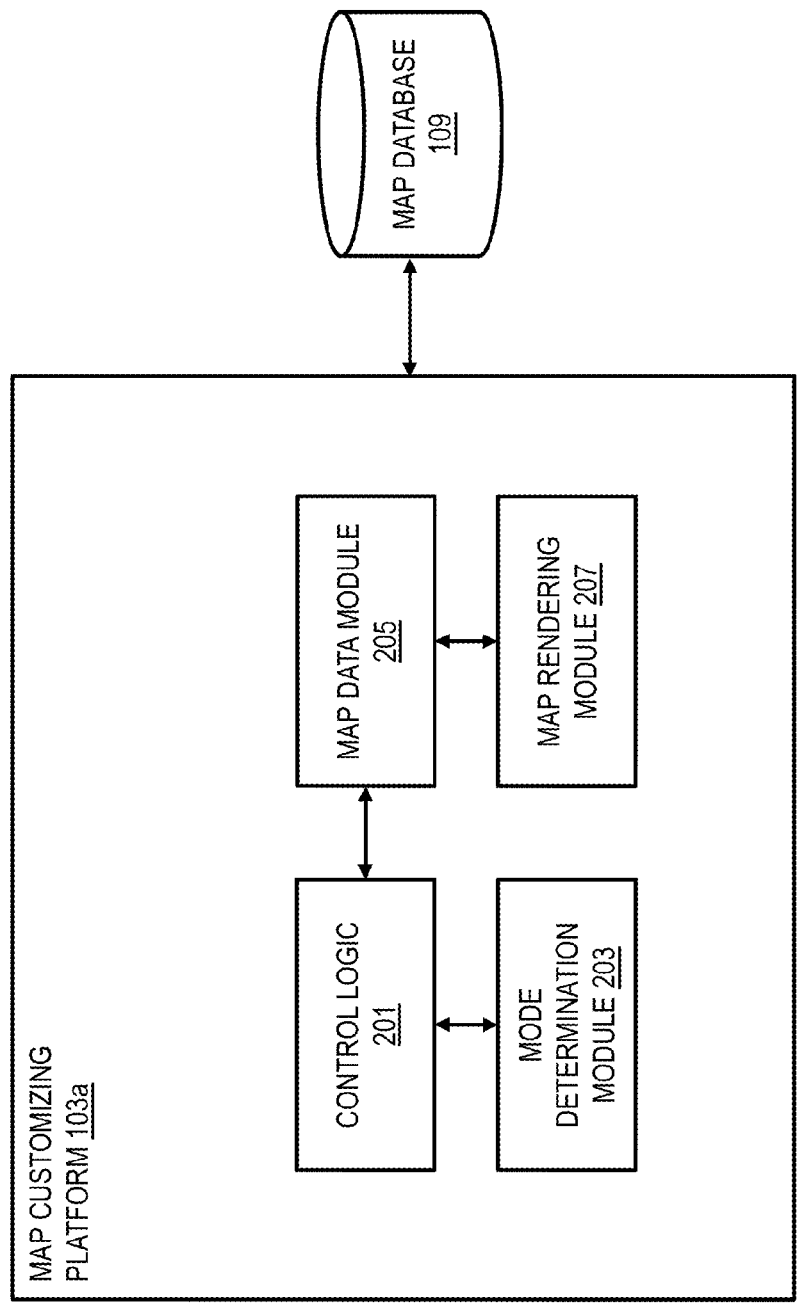
FIG. 2 is a diagram of the components of a map customizing platform, according to one embodiment.

FIG. 2 is a diagram of the components of the map customizing platform 103, according to one embodiment. By way of example, the map customizing platform 103 includes one or more components for customizing map presentations based on mode of transport. It is contemplated that the functions of these components may be combined in one or more components or performed by other components of equivalent functionality. In this embodiment, the map customizing platform 103 includes at least a control logic 201 which executes at least one algorithm for executing functions of the map customizing platform 103, and a mode determination module 203 for collecting information regarding and/or determining one or more modes of transport associated with the UE 101. For example, the mode determination module 203 can request and receive input from a user of the UE 101 for specifying the preferred mode of transport. It is contemplated that the user may specify more than one mode of transport for a single session or trip. In addition or alternatively, the mode determination module 203 may automatically detect the modes of transport associated with the UE 101 by retrieving context information from the UE 101, the service platform 111, or other component of the network 105. For example, if the UE 101 is moving, the speed at which the UE 101 is traveling can be used to infer a mode of transport. In another example, a schedule associated with the UE 101 can be retrieved from a calendar service (e.g., hosted at the service platform 111) to determine whether the user of the UE 101 has scheduled a trip.

The map customizing platform 103 also includes a map data module 205 for retrieving and manipulating map data from, for instance, the map database 109, and a map rendering module 207 for presenting the processed map data based on determined modes of transport. In one embodiment, the map data module 205 can collect map data via an independent map-making component or in conjunction with a GPS receiver. In addition or alternatively, the map data module 205 can retrieve map data from a mapping service (not shown) of the service platform 111. The map rendering module 207 can work independently or in conjunction with the application 107 or the service platform 111 to render map elements in the map display according to the characteristics selected based on the determined mode of travel. In one embodiment, rendering may include providing visual effects (e.g., line widths, line styles, fonts, font sizes, icons, models, color schemes, etc.) on a map element such as a point of interest in a map (e.g., a building, a park, a casino, etc.), or on parts of the maps (e.g., paths, roads, biking trails, shopping malls, neighborhood districts, etc.). The visual effects include, but are not limited to, 2D, 3D, holographs, animation, models, animation, images, augmented reality, audio alerts, media files, etc.

Alternatively, the functions of the map customizing platform 103 can be implemented via an application (e.g., a widget) 107 in the user equipment 101 according to another embodiment. By way of example, widgets are light-weight applications, and provide a convenient means for presenting information and accessing services. It is contemplated that the functions of these components may be combined in one or more components or performed by other components of equivalent functionality. In this embodiment, the application 107 includes modules similar to those of the map customizing platform 103, as previously described. To avoid data transmission costs as well as save time and battery, the control logic of the application 107 can fetch map and/or user context data cached or stored in its own database, without requesting data from any servers or external platforms, such as the map customizing platform 103, the service platform 111, or the service platform 111. Usually, if the UE 101 is online, data queries are made to online search server backends, and once the device is off-line, searches are made to off-line indexes locally.

Figure 3:
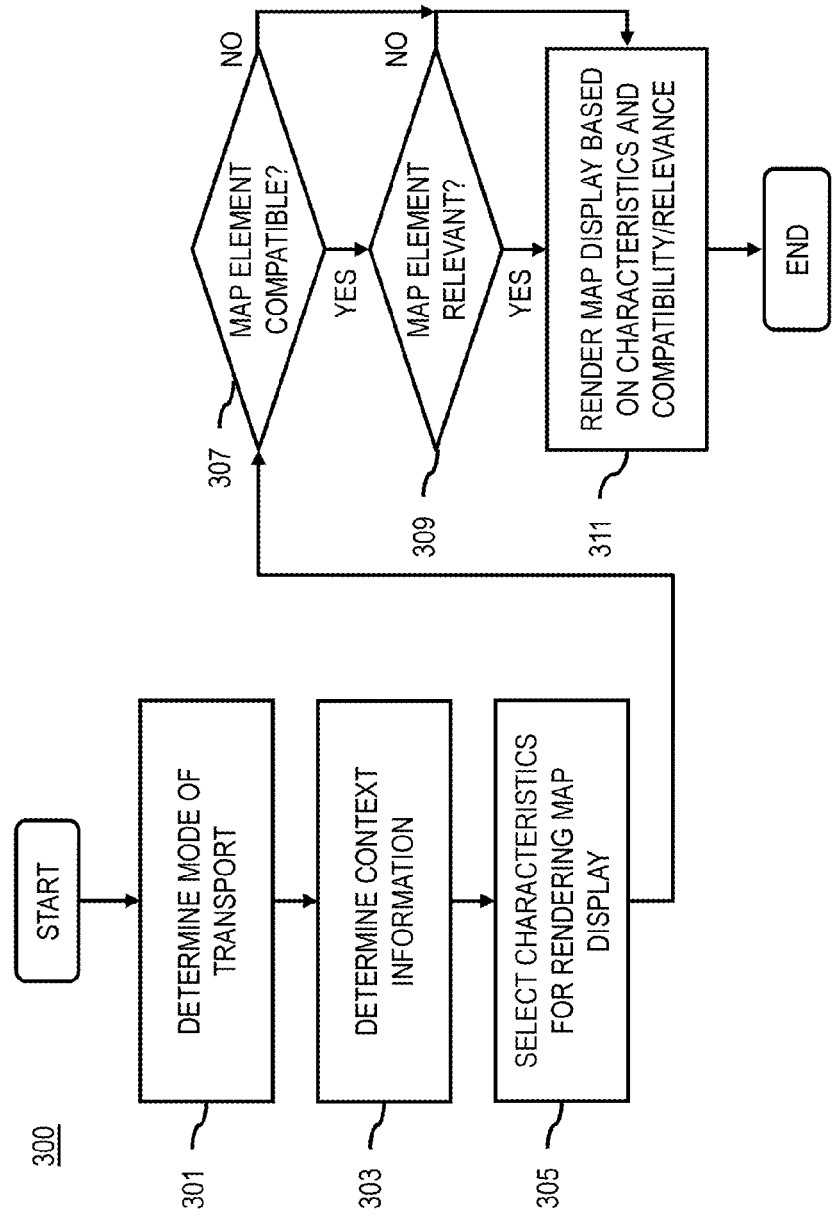
FIG. 3 is a flowchart of a process for customizing map presentations based on mode of transport, according to one embodiment.

FIG. 3 is a flowchart of a process 300 for customizing map presentations based on mode of transport, according to one embodiment. In one embodiment, the map customizing platform 103 performs the process 300 and is implemented in, for instance, a chip set including a processor and a memory as shown FIG. 6. In step 301, the map customizing platform 103 determines one or more modes of transport with respect to a mapping service. In other words, the map customizing platform 103 determines how the user intends to travel (e.g., driving, walking, bicycling, taking public transportation, etc.) when using the mapping service. It is contemplated that the user need not actually engage in travel using the mode of the determined mode of transportation. For example, the user may indicate a mode of travel merely to view the map (e.g., to look up points of interest, view nearby features, etc.). As discussed previously, the determination of the mode of travel can be made explicitly (e.g., by direct input from the user) or implicitly (e.g., inferred from a context information or other information associated with the UE 101). The map customizing platform 103 can, for instance, infer context information by looking at data such as (1) browsing by a user via Internet a resource that is related to the context (e.g., taking a tour of a museum or other sightseeing activity), (2) mentioning a context by the user in the user's calendar appointments, (3) creating communications (e.g., calls, messages, etc.) by the user related to the context, (4) media items (articles, music, video, photos, etc. posted in blogs on web pages, etc.) created by the user regarding the context, etc. By way of example, the map customizing platform 103 may conduct content analysis of the communications (e.g., text or audio messages, etc.) by the user to look for expressions of context information. Moreover, the user may specify or the platform 103 may infer more than one mode of travel. For example, the user may intend to walk to an intermediate destination in the map display and then take public transportation to the remaining way to the ultimate destination. In this example, the map customizing platform 103 can make a determination that the user intends to engage in a multi-modal means of transport.

After making the determination of the modes of transport, the platform 103 optionally determines any context information (e.g., time, date, weather, activity, etc.) associated with the mode of travel (step 303). As with the mode of transport, the platform 103 may determine the context information explicitly (e.g., by input from the user) or implicitly (e.g., from the service platform 111 or other source of information regarding the user and/or the UE 101). For example, the context may specify the time of day associated with the mode of transport (e.g., walking by day, walking by night, etc.). In another use case, the context information may specify an activity (e.g., sightseeing, shopping, etc.) associated with the mode of travel. This context information, for instance, enables the platform 103 to more finely tune the customization of the rendered map display to increase the likelihood that the platform will highlight map elements of potential interest of the user.

Based on the mode of transport and the context information, the map customizing platform 103 then selects one or more characteristics for rendering a map display (step 305). In one embodiment, the characteristics may, for instance, attempt to maximize the visibility of key elements within the map display. Accordingly, the characteristics include properties such as line widths, line styles, fonts, font sizes, color schemes, and the like. As discussed previously, the platform 103 selects the specific characteristics to provide better visibility for valuable information which reducing clutter from less valuable information. For example, if the user selects to view a pedestrian map display at night, map elements may rendered with characteristics that make mapping information under such a context more visible (e.g., highlighting well lit pathways, while de-emphasizing darkened alley ways).

In one embodiment, the process 300 includes evaluating whether a map element in the map display is compatible with the determined mode of travel (step 307). The platform may then render the map element based on the determined compatibility information. For example, if a pedestrian map is selected, the platform 103 may render streets that are not accessible to pedestrians (e.g., busy highways with no sidewalks) with a dotted line to indicate that the streets may not be used by (i.e., is not compatible with) pedestrians. This process can also be used to determine whether features that are specific to a particular mode of travel should be rendered. For example, pedestrian related features (e.g., stairs, escalators, bridges, tunnels, elevators, etc.) can be indicated using, for instance, an icon or other representation in the map display if a pedestrian map is selected. When rendering a driving map, the same features are not accessible by car, therefore, the platform 103 does not render these features for driving maps.

In addition, even if a map element is otherwise compatible with a particular mode of travel, the platform 103 may nonetheless determine whether the map element is relevant to the mode of travel (step 309). If the element is not relevant, the platform 103 may omit the rendering of the element or otherwise make the element less prominent. For example, the rendering of bus stops may be compatible with a driving map, but the information is not likely to be relevant because the user intends to drive rather than take public transportation. Accordingly, the platform may determine that bus stops should not be rendered in a driving map to reduce clutter. Likewise, highway exits may be rendered in a driving map, but not rendered in a pedestrian map. Finally, based on the selected characteristics and the determined compatibility and relevance information, the platform 103 renders the map display to reflect the mode of transport and/or the related context information. In one embodiment, the map customizing platform 103 can dynamically update the rendering of the map display as, for instance, the determined mode of transport (e.g., in a multi-modal situation) or other context information (e.g., an associated activity, weather, time, etc.) changes.

Figure 4B:
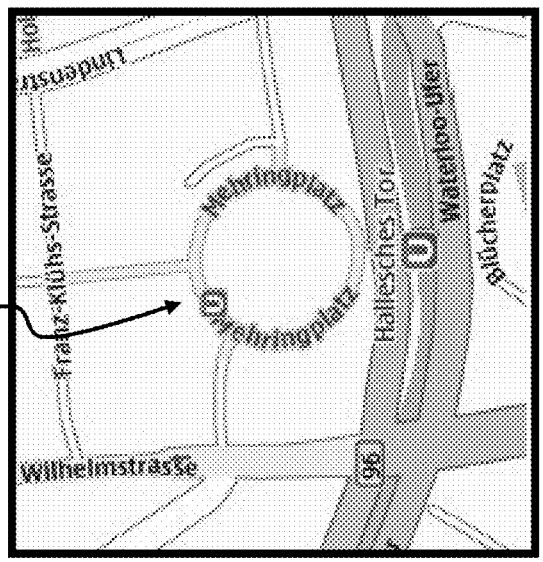
FIGS. 4A-4F are diagrams of maps utilizing the process of FIG. 3, according to various embodiment.
Figure 4A:
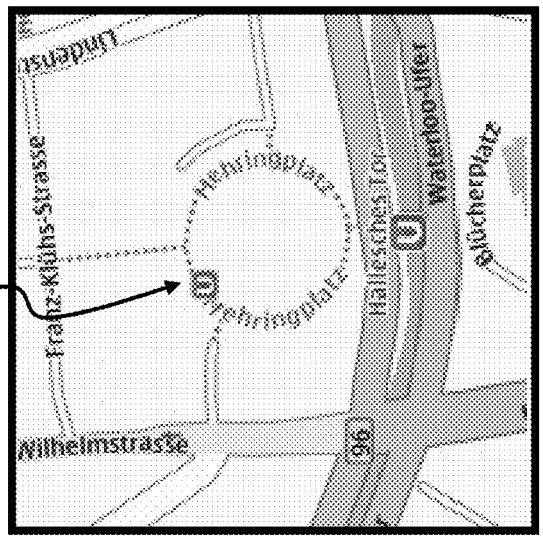

FIGS. 4A-4F are diagrams of maps utilizing the process of FIG. 3, according to various embodiments. FIGS. 4A and 4B are maps of the same area rendered respectively for a driving mode of transport and a pedestrian mode of transport. As shown in FIG. 4A, the map display depicts a pathway 401 that is not accessible by cars. In this example, the map customizing platform 103 has rendered the pathway 401 as a dotted line to indicate that the pathway is not compatible with the driving mode of transport. The dotted line also serves to reduce the prominence of the pathway 401 to a driver and provide an easily identifiable visual representation to indicate that drivers cannot access the path.

FIG. 4B is the same area and mapping information rendered using rendering characteristics specific to a pedestrian mode of transport. As shown, the pathway 401 of FIG. 4A is now rendered in FIG. 4B more prominently as a thicker line representing an open pathway 405. This more prominent rendering identifies that the pathway 405 as open and accessible to pedestrian traffic. Accordingly, a pedestrian can easily identify that this pathway is available. In contrast to traditional approaches that reflect inaccessible streets by merely routing around those streets while generally maintaining the same rendering, the approach described herein changes the rendering of the street (e.g., map element) itself to reflect accessibility under different modes of transport. This approach advantageously reduces the burden on users by enabling users to quickly identify accessible streets under different modes of transport without resorting to requesting routing information.

Figure 4D:
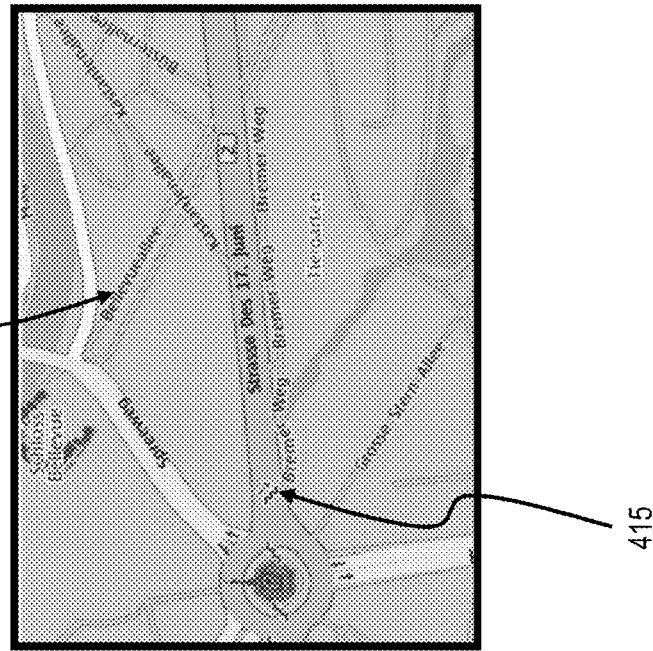
Figure 4C:
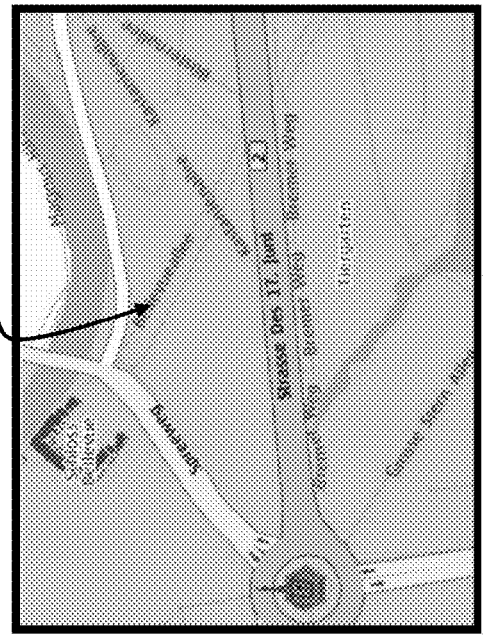

FIGS. 4C and 4D are maps providing another example of differential rendering based on the mode of transport, according to various embodiments. FIGS. 4C and 4D are maps of the same area rendered respectively for a driving mode of transport and a pedestrian mode of transport. As shown in FIG. 4C, a series of pedestrian pathways 409 is rendered using characteristics that specify a thin line width to indicate that the pathways 409 are inaccessible to car traffic. In contrast, FIG. 4D renders the same network of pathways 413 using a thicker line to indicate accessibility by pedestrian traffic. In addition, FIG. 4D includes the rendering of an icon 415 representing pedestrian tunnel underneath the roadway that is accessible to pedestrians. This same icon 415 is not rendered in the driving mode display of FIG. 4C because information regarding such a pedestrian tunnel is generally not relevant to those traveling by car. In this way, the driving mode map of FIG. 4C is rendered free of potentially irrelevant information to make more valuable information more prominent.

Figure 4F:
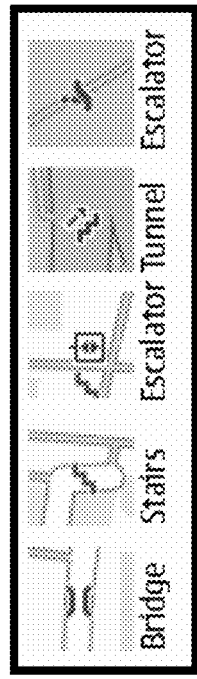
Figure 4E:
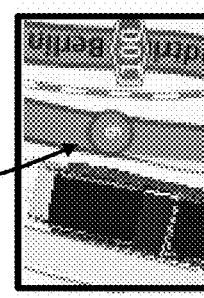

FIG. 4E is a diagram depicting other example icons representing other map elements or features that are specific to pedestrian mode maps, according to one embodiment. The icon legend 417 depicts icons representing a pedestrian bridge, a stairway, an elevator, a pedestrian tunnel, and an escalator. As described above, these icons can be displayed when rendering a pedestrian mode map and then hidden when rendering, for instance, a driving mode map where such features are not relevant.

FIG. 4F provides an example of a feature that is relevant to a driving mode map but not to a pedestrian mode map. As shown, map section 421 depicts a highway marked with an icon 425 to indicate a highway exit (e.g., highway exit 9). Map section 423 depicts the same highway section rendered in pedestrian mode, wherein the highway exit is not rendered. In this case, the highway exit is not generally relevant to pedestrian travel because highways are typically accessible only to cars. Accordingly, to reduce clutter and unnecessary information in the pedestrian map display the map customizing platform 103 renders the pedestrian map without the highway exit feature.

The processes described herein for providing customized map presentation may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
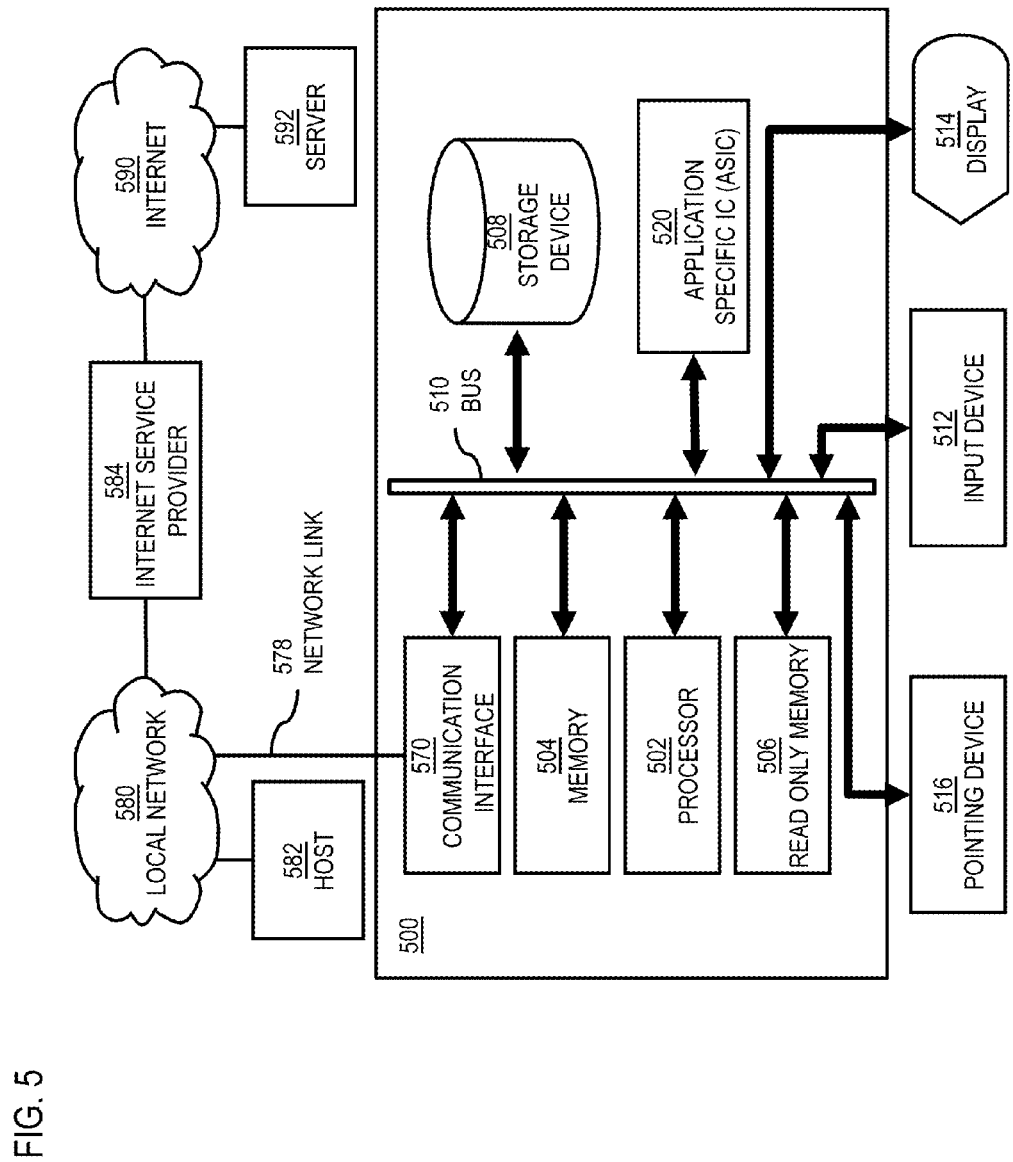
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to customize a map presentation as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of customizing a map presentation.

A bus 510 includes one or more parallel conductors of information so that information is transferred quickly among devices coupled to the bus 510. One or more processors 502 for processing information are coupled with the bus 510.

A processor 502 performs a set of operations on information as specified by computer program code related to customize a map presentation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for customizing a map presentation. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for customizing a map presentation, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for customizing a map presentation.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
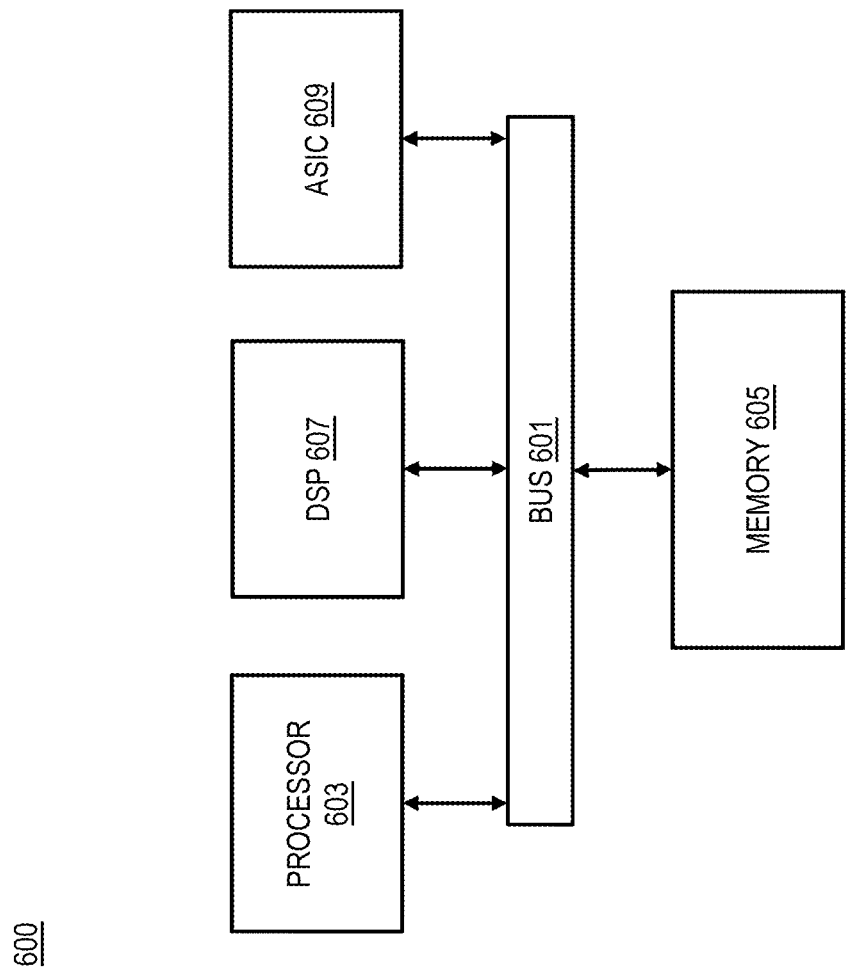
FIG. 6 is a diagram of a chip set that can be used to implement an embodiment of the invention.

FIG. 6 illustrates a chip set 600 upon which an embodiment of the invention may be implemented. Chip set 600 is programmed to customize a map presentation as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of customizing a map presentation.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to customize a map presentation. The memory 605 also stores the data associated with or generated by the execution of the inventive steps.

Figure 7:
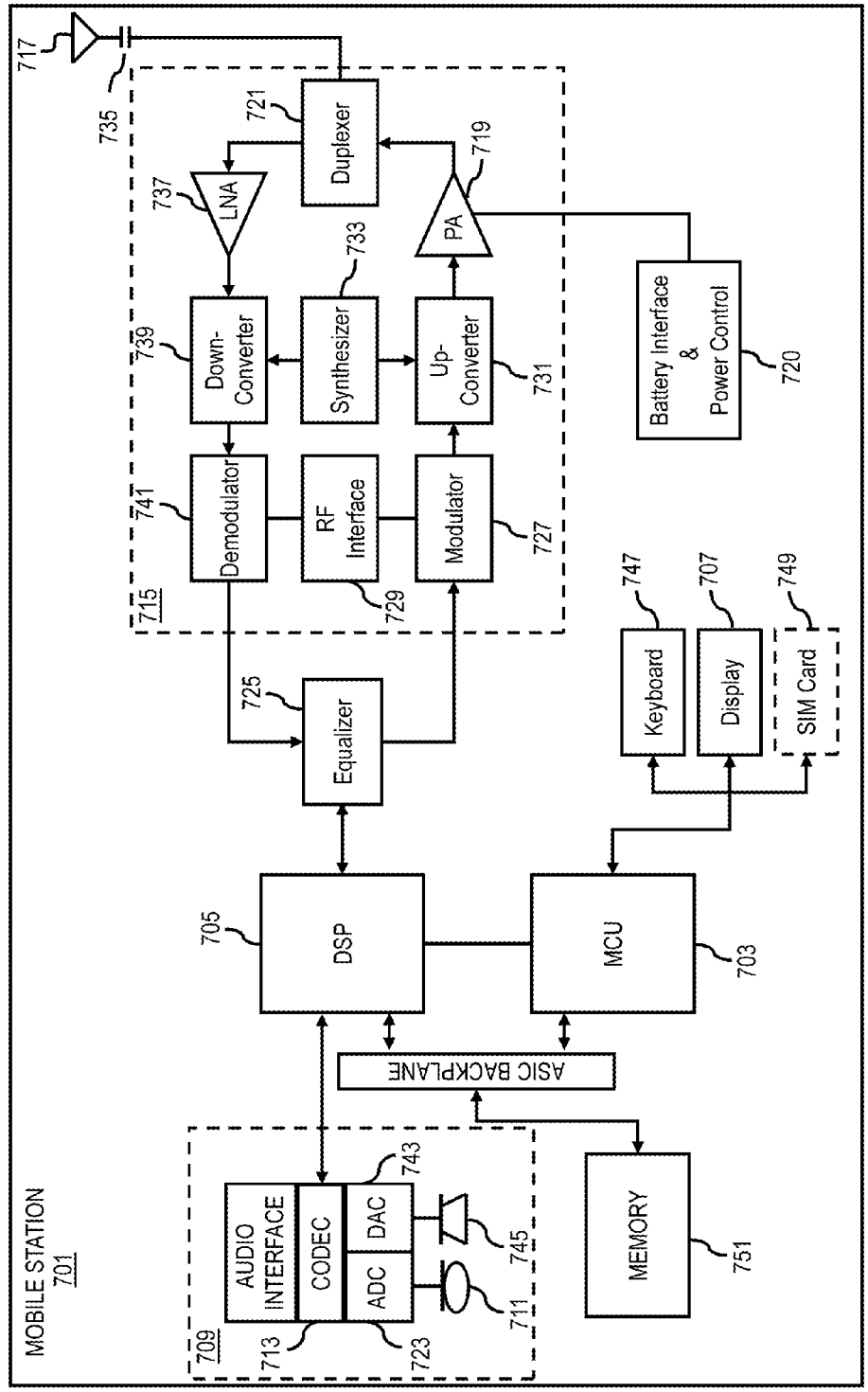
FIG. 7 is a diagram of a mobile terminal (e.g., a handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 700, or a portion thereof, constitutes a means for performing one or more steps of customizing a map presentation. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of customizing a map presentation. The display 7 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to customize a map presentation. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    specifying a mode of travel with respect to a mapping service for determining one or more characteristics of one or more map elements, wherein the characteristics relate to presentation of the one or more map elements; and
    rendering the map elements on a map display based, at least in part, on the mode of travel using the determined characteristics.

2. A method of claim 1, further comprising:
    determining whether at least one of the map elements is compatible with the mode of travel,
    wherein the rendering of the at least one map element is further based, at least in part, on the characteristics if the at least one map element is compatible with the mode of travel.

3. A method of claim 1, further comprising:
    determining whether at least one of the map elements is relevant to the mode of travel,
    wherein the rendering of the at least one map element is further based, at least in part, on the characteristics if the at least one map element is relevant to the mode of travel.

4. A method of claim 1, further comprising:
    determining context information associated with at least one of the map elements,
    wherein the rendering of the at least one map element is further based, at least in part, on the characteristics and the context information.

5. A method of claim 4, wherein the context information includes time, date, weather, activity, or a combination thereof.

6. A method of claim 1, wherein the characteristics relate to one or more visual effects that relate to line widths, line styles, fonts, font sizes, icons, models, color schemes, audio alerts, media files, or a combination thereof.

7. A method of claim 1, wherein the mode of travel includes a driving mode, a pedestrian mode, a public transportation mode, a bicycling mode, or a combination thereof.

8. A method of claim 1, wherein the map elements include a path, a road, a route, a point of interest, a terrain feature, a bridge, an elevator, an escalator, or a stairway.

9. An apparatus comprising:
    at least one processor; and
    at least one memory including computer program code,
    wherein the at least one memory and the computer program code configured to, with the at least one processor, cause the apparatus to perform at least the following:
    specify a mode of travel with respect to a map-related service for determining one or more characteristics of one or more map elements, wherein the characteristics relate to presentation of the one or more map elements; and
    render the map elements on a map display based, at least in part, on the mode of travel using the determined characteristics.

10. An apparatus of claim 9, wherein the apparatus is further caused to:
    determine whether at least one of the map elements is compatible with the mode of travel,
    wherein the rendering of the at least one map element is further based, at least in part, on the characteristics if the at least one map element is compatible with the mode of travel.

11. An apparatus of claim 9, wherein the apparatus is further caused to:
    determine whether at least one of the map elements is relevant to the mode of travel,
    wherein the rendering of the at least one map element is further based, at least in part, on the characteristics if the at least one map element is relevant to the mode of travel.

12. An apparatus of claim 9, wherein the apparatus is further caused to:
    determine context information associated with at least one of the map elements,
    wherein the rendering of the at least one map element is further based, at least in part, on the characteristics and the context information.

13. An apparatus of claim 12, wherein the context information includes time, date, weather, activity, or a combination thereof.

14. An apparatus of claim 9, wherein the characteristics relate to one or more visual effects that relate to line widths, line styles, fonts, font sizes, icons, models, color schemes, audio alerts, media files, or a combination thereof.

15. An apparatus of claim 9, wherein the mode of travel includes a driving mode, a pedestrian mode, a public transportation mode, a bicycling mode, or a combination thereof.

16. An apparatus of claim 9, wherein the map elements include a path, a road, a route, a point of interest, a terrain feature, a bridge, an elevator, an escalator, or a stairway.

17. A non-transitory computer-readable storage medium carrying one or more sequences of one or more instructions which, when executed by one or more processors, cause an apparatus to perform at least the following:
    specifying a mode of travel with respect to a mapping service for determining one or more characteristics of one or more map elements, wherein the characteristics relate to presentation of the one or more map elements; and
    rendering the map elements on a map display based, at least in part, on the mode of travel using the determined characteristics.

18. A non-transitory computer-readable storage medium of claim 17, wherein the apparatus is caused to further perform:
    determining whether at least one of the map elements is compatible with the mode of travel,
    wherein the rendering of the at least one map element is further based, at least in part, on the characteristics if the at least one map element is compatible with the mode of travel.

19. A non-transitory computer-readable storage medium of claim 17, wherein the apparatus is caused to further perform:
    determining whether at least one of the map elements is relevant to the mode of travel,
    wherein the rendering of the at least one map element is further based, at least in part, on the characteristics if the at least one map element is relevant to the mode of travel.

20. A non-transitory computer-readable storage medium of claim 17, wherein the characteristics relate to one or more visual effects that relate to line widths, line styles, fonts, font sizes, icons, models, color schemes, audio alerts, media files, or a combination thereof.

* * * * *